(12) United States Patent
Coszach et al.

(10) Patent No.: US 7,488,783 B2
(45) Date of Patent: Feb. 10, 2009

(54) METHOD FOR THE PRODUCTION OF POLYACTIDE FROM A SOLUTION OF LACTIC ACID OR ONE OF THE DERIVATIVES THEREOF

(75) Inventors: Philippe Coszach, Courcelles (BE); Jean-Christophe Bogaert, Ligne (BE); Frederic Van Gansberghe, Linkebeek (BE)

(73) Assignee: Brussels Biotech, Brussels (BE)

( * ) Notice: Subject to any disclaimer, the term of this patent is extended or adjusted under 35 U.S.C. 154(b) by 101 days.

(21) Appl. No.: 10/523,061

(22) PCT Filed: Aug. 4, 2003

(86) PCT No.: PCT/EP03/50360

§ 371 (c)(1),
(2), (4) Date: Aug. 24, 2005

(87) PCT Pub. No.: WO2004/014889

PCT Pub. Date: Feb. 19, 2004

(65) Prior Publication Data

US 2006/0014975 A1 Jan. 19, 2006

(30) Foreign Application Priority Data

Aug. 6, 2002 (BE) .................................. 2002/0469

(51) Int. Cl.
*C08G 63/08* (2006.01)

(52) U.S. Cl. ...................... 525/450; 525/415; 549/274; 549/231; 528/480

(58) Field of Classification Search ................. 525/450, 525/415; 549/274, 231; 528/480
See application file for complete search history.

(56) References Cited

U.S. PATENT DOCUMENTS

| 5,502,215 | A  | * | 3/1996  | Yamaguchi et al. | 549/274 |
| 5,521,278 | A  | * | 5/1996  | O'Brien et al.   | 528/354 |
| 6,310,218 | B1 | * | 10/2001 | O'Brien et al.   | 549/231 |
| 6,326,458 | B1 | * | 12/2001 | Gruber et al.    | 528/354 |
| 6,800,767 | B2 | * | 10/2004 | Van Gansberghe et al. | 549/274 |

FOREIGN PATENT DOCUMENTS

| EP | 1 136 480 | | 9/2001 |
| WO | WO 93 15127 | | 8/1993 |
| WO | WO 0170721 A1 | * | 9/2001 |

OTHER PUBLICATIONS

Melt crystallization experts, internet page.*
International Search Report dated Oct. 14, 2003.

* cited by examiner

*Primary Examiner*—Randy Gulakowski
*Assistant Examiner*—Alicia M Toscano
(74) *Attorney, Agent, or Firm*—Carlson, Gaskey & Olds

(57) ABSTRACT

A process for the production of polylactide, the stages of which for the production and purification of lactide, starting from an aqueous solution of lactic acid or of its derivatives, includes evaporation of water with formation of oligomers, depolymerization to give lactide, condensation and then crystallization of the crude lactide product to give purified lactide, aqueous treatment of the residual fractions from the crystallization and polymerization of purified and/or prepurified lactide to give polylactide in an extruder and in the presence of catalysts. An alternative process includes carrying out the aqueous treatment before the crystallization.

34 Claims, 1 Drawing Sheet

Low-temperature industrial process for the production of PLA starting from an a-hydroxylated carboxylic acid or one of its esters

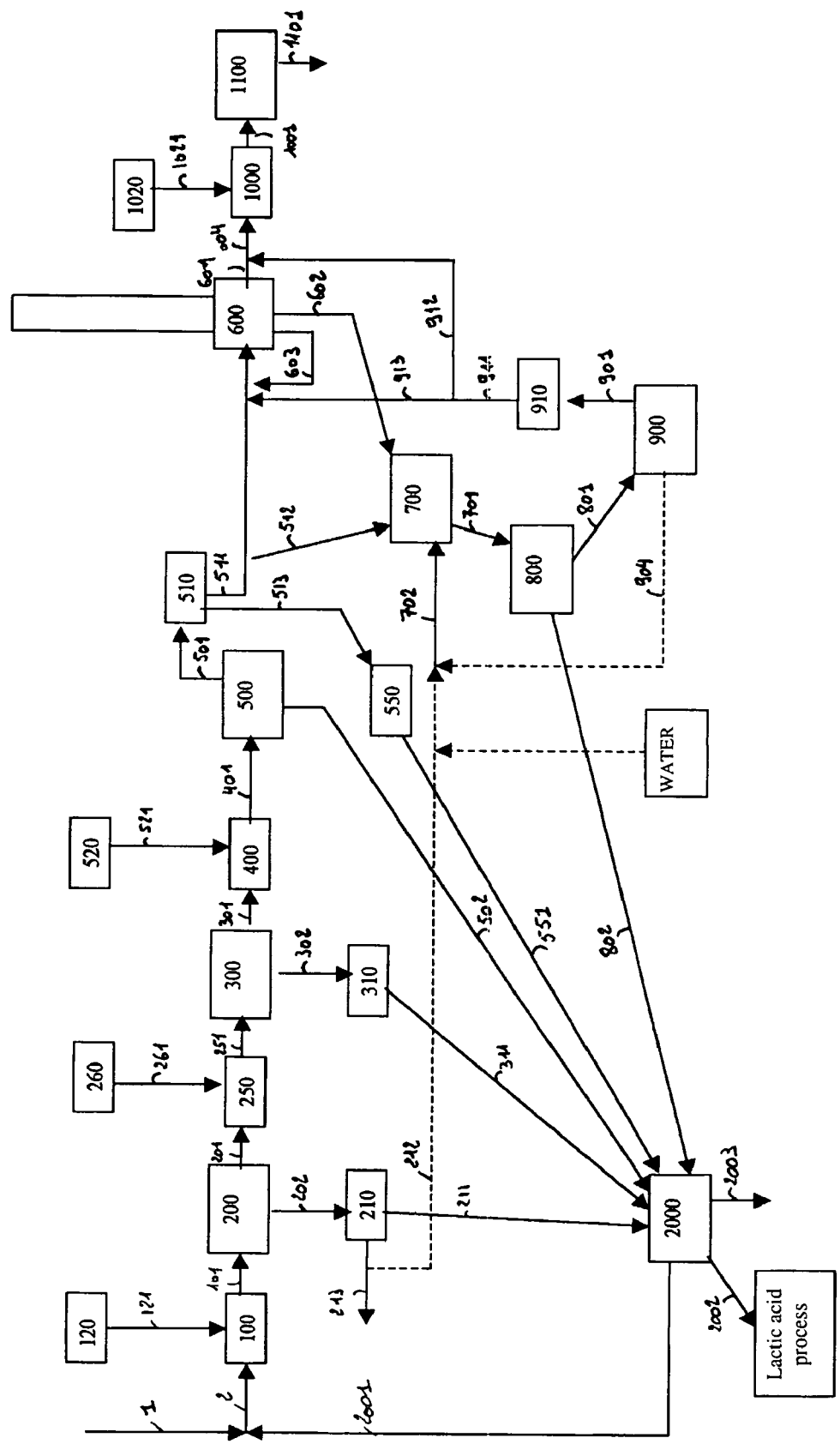
FIG 1. Low-temperature industrial process for the production of PLA starting from an a-hydroxylated carboxylic acid or one of its esters

METHOD FOR THE PRODUCTION OF POLYACTIDE FROM A SOLUTION OF LACTIC ACID OR ONE OF THE DERIVATIVES THEREOF

REFERENCE TO RELATED APPLICATIONS

This application claims priority to PCT Application PCT/EP03/050360 filed on Aug. 4, 2003, which claims priority to Belgian Patent Application BE 2002/0469 filed on Aug. 6, 2002.

INTRODUCTION

BACKGROUND OF THE INVENTION

A multitude of processes for the preparation and/or purification of lactide and polylactide (PLA) have been described in the literature to date. However, it has to be observed that, even if their scientific interest is undeniable, the very great majority of these processes remain laboratory processes which could never be operated industrially. This is because they have recourse either to highly specific (if not unique) equipment having no equivalent on the industrial scale, which renders their extrapolation and/or management very hazardous or complicated; or to a very low productive output and/or the substantial use of consumables which prevent any economically profitable operation of the process.

In point of fact, although resulting from a renewable starting material (not dependent on oil) and benefiting from a biodegradability which makes it possible to envisage it as one of the solutions to the increasing problem of waste, PLA will find its welcome only in the context of a cost price comparable to those currently available for polymers of petrochemical origin of the commodity products sector.

Nevertheless, two processes resulting from the state of the art might meet these requirements.

The first is disclosed in U.S. Pat. No. 5,274,073 of Gruber et al.

Gruber et al. envisage an integrated process for the synthesis of PLA starting from a solution (more or less pure) of lactic acid and/or of one of its esters comprising:

1. in one or two stages, evaporation of the free water and of a portion of the bonded water, so as to produce an oligomer with a molecular mass of between 100 and 5000 amu;
2. mixing the depolymerization catalyst with the oligomer, followed by thermal cracking of the mixture with production of lactide in the vapor form;
3. selective condensation of the vapors, followed by fractional distillation, making it possible to recover a purified lactide; and
4. polymerization of the purified lactide by ring opening to produce PLA.

The second is disclosed in U.S. Pat. No. 5,521,278 of O'Brien et al.

O'Brien et al. envisage an integrated process for the synthesis of the purified lactide for PLA starting from an aqueous lactic acid solution comprising at least 50% by weight of lactic acid comprising:

1. evaporation of the free water and of a small portion of the bonded water, so as to produce an oligomer comprising a number of monomer units (n) of between 2 and 8;
2. continuing the evaporation characterized by a greater diffusion surface area for the polymer and making it possible to obtain an oligomer comprising a number of monomer units (n) of between 8 and 25, stages 1 and 2 being carried out in equipment having a structure characterized by a low iron content;
3. mixing the depolymerization catalyst, devoid of alkali metals, with the oligomer, followed by thermal cracking of the mixture at a temperature below 240° C. with production (a) of a vapor phase comprising lactic acid, water, lactide and entrained heavy oligomers and (b) of a liquid phase comprising the heavy oligomers;
4. extraction of the fraction in the vapor form (a), so that its residence time in the cracking region is less than 15 seconds;
5. selective condensation of the vapors, followed by fractional distillation, making it possible to recover, by an intermediate extraction, a prepurified lactide in the liquid form; and
6. melt crystallization of the prepurified lactide, so as to result in a purified lactide fraction characterized by a residual acidity of less than 6 meq/kg.

Although these two processes appear advantageous, they have a number of shortcomings which might render problematic their chances of being used in an economic and profitable way for the production of a PLA of the quality for the commodity products sector.

If the teachings of Gruber et al. are considered, it is noticed that, by this process, the quality of the lactide obtained is not sufficient to make possible the synthesis of a polymer (PLA) with mechanical properties corresponding to those of the various applications selected. This is because it is well known to persons skilled in the art that the lowest possible contents of residual water and residual acidity are required in order to obtain polymers of high molecular mass (mechanical properties) with a high conversion (mechanical properties, stability, yield) and in a short reaction time (chemical and thermal stability; productive output).

In point of fact, by the purification technology selected, namely distillation, it is impossible to obtain, first, an optically pure product [the vapor pressure curves of the various stereoisomers (L-lactide or L-LD, D-lactide or D-LD, meso-lactide or meso-LD) being much too close, which proves to be essential for applications requiring a degree of crystallinity of the polymer] and, secondly, a chemically pure product as, by their own admission, they recognise that they cannot totally avoid the opening of the lactide ring in the distillation column and thus the contamination of the lactide in the system.

If the teachings of O'Brien are considered, it is noticed, following the introduction of an additional stage, namely the melt crystallization, that the optical and chemical quality of the lactide is achieved. However, the new process recommended consists of an extensive sequence of different technologies which, first, increases the complexity in the management of the process and, secondly, renders problematic its economic profitability, both with regard to capital costs and production costs. Furthermore, if all the stages of the process (evaporations; thermal cracking and distillation), with the exception of the melt crystallization, are examined, they are all characterized by high operating temperatures, which is in contradiction with the rules of the art generally recommended in the context of the synthesis of a heat-sensitive product, such as lactide.

SUMMARY OF THE INVENTION

In the continuation of this text, unless otherwise indicated, the percentages are expressed by weight and the molecular masses by atomic mass unit (amu). In a first embodiment, the invention consists of a low-temperature integrated process for the production and purification of lactide starting from an aqueous solution of lactic acid or of lactic acid derivatives, comprising:
a) evaporation of the free water and of a portion of the water of constitution until oligomers having a molecular mass of between 400 and 2000 amu, a total acidity as lactic acid equivalent of between 119 and 124.5% and an optical purity, expressed as L-lactic acid, of between 90 and 100% are obtained;
b) feeding the mixture comprising a depolymerization catalyst and the oligomers obtained in a) to a depolymerization reactor with production of:
  b1) a lactide-rich vapor phase, and
  b2) an oligomer-rich liquid residue;
c) selective condensation of the lactide-rich vapor (b1) with recovery, in the liquid form, of a crude lactide product freed from the volatile compounds;
d) melt crystallization of the crude lactide product (c), with production of a purified lactide fraction having a residual acidity of less than 10 meq/kg, a water content of less than 200 ppm and a meso-lactide content of less than 1%;
e) aqueous treatment of the residual fractions from the melt crystallization, consisting of:
  e1) extractive and controlled crystallization of these fractions in an aqueous medium, with control of the geometry of the crystals formed and with segregation of the lactide suspension towards the solid phase and of the impurities towards the liquid phase, so as to carry out aqueous extraction of the impurities;
  e2) separation of the suspension of crystals (e1) from the liquid phase and then draining, which separates a wet cake rich in lactide crystals from a liquid phase depleted in lactide and laden with impurities;
  e3) drying the wet cake (e2), which provides the prepurified lactide.

A second embodiment of the invention consists of a low-temperature integrated process for the production and purification of lactide starting from an aqueous solution of lactic acid or of lactic acid derivatives, comprising:
a) evaporation of the free water and of a portion of the water of constitution until oligomers having a molecular mass of between 400 and 2000 amu, a total acidity as lactic acid equivalent of between 119 and 124.5% and an optical purity, expressed as L-lactic acid, of between 90 and 100% are obtained;
b) feeding the mixture comprising a depolymerization catalyst and the oligomers obtained in a) to a depolymerization reactor with production of:
  b1) a lactide-rich vapor phase, and
  b2) an oligomer-rich liquid residue;
c) selective condensation of the lactide-rich vapor (b1) with recovery, in the liquid form, of a crude lactide product freed from the volatile compounds;
d) aqueous treatment of the crude lactide product resulting from (c) consisting of:
  d1) extractive and controlled crystallization in an aqueous medium, with control of the geometry of the crystals formed and with segregation of the lactide suspension towards the solid phase and of the impurities towards the liquid phase, so as to carry out aqueous extraction of the impurities;
  d2) separation of the suspension of crystals (d1) from the liquid phase and then draining, which separates a wet cake rich in lactide crystals from a liquid phase depleted in lactide and laden with impurities;
  d3) drying the wet cake (d2), which provides a prepurified lactide;
e) melt crystallization of the prepurified lactide (d3), with production of a purified lactide fraction having a residual acidity of less than 10 meq/kg, a water content of less than 200 ppm and a meso-lactide content of less than 1%.

However, the invention also proves to be advantageous in the context of a process for the production of polylactide, the phase of production and of purification of lactide starting from an aqueous solution of lactic acid or of lactic acid derivatives comprising stages a) to e3) of the first embodiment above, to which a stage of polymerization of lactide to polylactide is added.

Very clearly, in the context of a process for the production of polylactide, a stage of polymerization of lactide to polylactide can also advantageously be added to the phase of production and of purification of lactide starting from an aqueous solution of lactic acid or of lactic acid derivatives comprising stages a) to e) of the second embodiment above.

In the present invention, the stage of the process which consists of an extractive and controlled crystallization in an aqueous medium of lactide fractions, with control of the geometry of the crystals formed and segregation of the lactide suspension towards the solid phase and of the impurities towards the liquid phase, so as to carry out an aqueous extraction of the impurities, exhibits specific characteristics:
  this crystallization is carried out with an amount of water which is as low as possible (for example, 0 to 25%);
  during the crystallization phase, the mixture (lactide+water) will be brought to and maintained at a temperature just below its crystallization temperature (for example, 5° C. below);
  the contact time of this mixture will be reduced as much as possible (for example, 1 to 45 min).

There are many advantages to proceeding in this way:
  large crystals are obtained which exhibit a lamellar structure, without inclusions or occlusions, and which are pure, stable and easy to handle;
  under these conditions, a complex (one molecule of lactide+one molecule of water) is also formed;
  no or only a little meso-lactide is removed by hydrolysis;
  the meso-lactide which is not removed by hydrolysis is thus recycled; this recycling represents a very worthwhile economic advantage for the process;
  the formation of large crystals also promotes the transfer of the impurities towards the aqueous phase;
  the formation of large crystals makes it possible to obtain more efficient subsequent separation and more efficient subsequent drying.

The formation of these large crystals is an essential indication that the process operates under conditions of temperatures, of times and of amounts of water in accordance with the invention: they are a confirmation of the fact that the process is indeed managed according to the invention. These large crystals are formed under conditions opposed to those of bulk crystallizations. The control of the crystallization according to the invention is carried out by control of the profile of the temperatures: no sudden fall but the obtaining and then maintenance for a certain time of a temperature just below the crystallization temperature.

By operating in that way, a region of weak supersaturation is encountered which promotes and makes it possible to control the growth of the crystals. In order to further improve this control, the mixture is seeded with pure lactide crystals in order to reduce as much as possible the formation of new nuclei.

It is not very easy to quantify the size of these large crystals with a lamellar structure. This is because the size can be measured along the 3 axes of the crystal but also by the mean value of the 3 measurements. Furthermore, the size of the crystals comes under a statistical and therefore random phenomenon. The size can also be quantified by passing through one or more sieves, by introducing a percentage of crystals which pass through the sieve, the remainder being rejected by one sieve in particular. Other principles of measurement are also possible. The measurement is further complicated when aggregates of crystals resulting from an industrial process, rather than isolated and perfectly formed crystals, are considered. In the case of bulk crystallization, it sometimes appears impossible to define an individual crystal. Finally, it is also necessary to take into account the variations inherent in any industrial process, which will cause the sizes to vary although all the parameters of the production process are unchanged.

It appears simpler to quantify the size of these crystals if the matter is examined comparatively. It is clear that the mean size of the individual crystals obtained by the process according to the invention, whatever the operating conditions but provided that the parameters indicated above (small amount of water added, temperature just below the crystallization temperature, contact time reduced as much as possible) are observed, is visibly greater than the mean size of individual crystals obtained by bulk crystallization (following a sudden fall in the temperature). A few measurements carried out in a rudimentary fashion during the 2 types of production process make it possible to say that, if the mean size by bulk crystallization is 0.1 mm, then the mean size by crystallization according to the invention is 0.5 mm or more. This comparison only has meaning, of course, if the chemical composition of the mixture subjected to the 2 types of crystallization is similar, indeed even identical, at the start. The values given above are therefore more orders of magnitude than absolute values.

Other advantageous aspects of the process mean that the starting lactic acid derivatives comprise lactic acid esters or a mixture of lactic acid and of one or more lactic acid esters.

It should be noted that, for the implementation of the invention, the crude lactide product is enriched in prepurified lactide fractions originating from the aqueous treatment of the residual fractions from the melt crystallization.

The recycling represents an important aspect of the implementation of the invention: the prepurified lactide resulting from the aqueous treatment can be recycled at any point in the production of purified lactide.

Moreover, it should be noted that the content of D-lactide, during the progression of the process, is controlled by polymerization by ring opening of the prepurified lactide.

Furthermore, it will be noted that, during the progression of the process, the prepurified lactide exhibits a residual water content of between 50 and 1000 ppm, a total lactide content of between 70 and 99%, a content of lactic acid and lactic acid oligomers of between 0 and 5% and a meso-lactide content of between 0 and 15%.

Finally, for the advantageous progression of the invention, the polymerization of the purified and/or prepurified lactide comprises the stages:
a) of addition of a catalyst or mixture of catalysts to the lactide;
b) of addition of optional comonomers, of oligomers, of prepolymers, of stabilizers, of fillers, of reinforcing agents or polymerization moderators to the mixture (a) during the initiation of the prepolymerization and/or during the polymerization in an extruder.

In some embodiments of the invention, the polymerization of the purified and/or prepurified lactide does not require prepolymerization.

For the process for the production of lactide according to the invention or of polylactide according to the invention, it should be noted that, during the production and the purification of lactide, the recycled fractions of lactic acid or of its derivatives are introduced in the purification stage of the process for the production of lactic acid or of its derivatives.

In contrast to the processes of the state of the art, in this invention the entire part intended to extract and to purify the lactide is carried out at low temperature (less than 105° C.), which is an important advantage in the context of an integrated process.

This is because, by operating at low temperature, in addition to an obvious economic advantage, any risk of racemization of the products and thus the formation of D-lactic units is removed. It is clear that, for the processes of the state of the art, these D-lactic units at a low concentration do not constitute a problem for the quality of the final lactide provided that they incorporate in the process a unit for stereospecific purification, such as, for example, melt crystallization. However, in the context of an integrated process, this concentration will gradually increase and a dysfunctioning in the various stages of the process will be observed. This is because a greater content of D-lactic units would randomly generate a greater proportion of meso-lactide or of D-lactide which, on the one hand would be highly injurious to the stability of the streams during the distillation (meso-lactide much less stable) and, on the other hand, would disrupt the satisfactory operation of the melt crystallization due to the presence of the racemic mixture or D-lactide (the optical quality of the final product then no longer being assured). It is therefore essential for these high-temperature processes to continuously remove its D-lactic units, thus reducing the overall yield of the process and, at the same time, its economic viability.

Another advantage of the low-temperature process is the possibility, because of the stage of extractive recrystallization in aqueous medium, of extracting, from the main stream, the infrequent D-lactic units generated during the first two stages of the process. This is because, on conclusion of this treatment, it is possible to obtain a lactide characterized by a chemical purity sufficient to be able to be used as (co)monomer for the synthesis of PLA but with an optical purity characterized by the joint presence of a meso- and L-lactide. This novel approach makes it possible to envisage a completely integrated and thus economically viable process.

Another innovative aspect of the present invention consists in recycling all or a portion of the hydrolyzed by-products resulting from the various stages of the process, such as the evaporation distillates, the depolymerization residue, the filtrate resulting from the extraction with water, and the like, not directly at the level of the process of the synthesis of the lactide but rather at the level of that of the production of lactic acid and more particularly before the stages of purification of lactic acid. This is because, by proceeding in that way, a gradual increase in the concentration of impurities, such as amino acids, proteins, glucides, heavy metals, aldehydes, and the like, present in a small amount in the starting material and which will disrupt the satisfactory operation (technical and economic) of the various stages of the process and the purity of the final product, is avoided.

BRIEF DESCRIPTION OF THE DRAWINGS

FIG. 1 is a diagram of the low-temperature industrial process for the production of polylactic acid starting from an alpha-hydroxylated carboxylic acid or one of its esters.

DETAILED DESCRIPTION OF PREFERRED EMBODIMENT

Preferably, the starting mixture will be an aqueous lactic acid solution obtained by the chemical route (hydrolysis of an ester), by the biochemical route (fermentation) or by mixing recycled fractions. Its lactic acid concentration can vary from 15 to 100%, it being known that the evaporation of this free water will result in additional costs.

The chemical and optical purity of the starting material is essential in order to provide a high conversion yield in the context of an integrated process. This is because an excessively low chemical purity of the lactic acid implies the concentration of impurities in the process, which, on the one hand, disturbs the chemistry related to the synthesis of the lactide (racemization, low purification yields) and, on the other hand, necessitates the introduction of bleeds, which will affect the mass balance of the process. Likewise, an excessively low initial optical purity will result in the appearance of a relatively large amount (statistical reality) of the other 2 diastereoisomers of the lactide (meso-lactide; D-lactide), which will only complicate the purification phase and increase the recycling and bleed streams. Although a food grade currently available commercially might be suitable, the grade corresponding to the "Heat Stable" grade, well known to a person skilled in the art, with an optical purity $\geq 95\%$ of L isomer and preferably $\geq 98\%$, is preferred.

This aqueous lactic acid solution is concentrated by evaporation so as to extract, in a first step, the free water and, subsequently, a portion of the water of constitution. The removal of this water of constitution is accompanied by the creation of ester bonds by "polycondensation" reaction, which results in the formation of lactic acid oligomers.

The oligomers synthesized are ideally characterized by a molecular mass of between 400 and 2000, a total acidity as lactic acid equivalent of between 119 and 124.5% and a D-lactic acid content of between 0 and 10%. This quality makes it possible to avoid, on the one hand, the problems related to the transfer of highly viscous products and, on the other hand, an excessively high residual acidity in the product obtained on conclusion of the depolymerization stage (synthesis of the lactide).

The evaporation will be carried out while taking care very particularly to avoid, on the one hand, excessively high entrainment of lactic units in the water vapors extracted and, on the other hand, subjecting the lactic acid and its oligomers to a prolonged thermal stress which would promote racemization reactions.

Several steps can be taken, jointly or otherwise, to avoid a prolonged thermal stress on the product.

The first consists in promoting the rapid extraction of the volatile compound (water) from the reaction medium, so as to shift the reaction balance towards the formation of oligomers and thus to reduce the reaction time. Entrainment of the volatile compound by vacuum and/or by gas stream constitute advantageous options for carrying out this stage.

A second consists in increasing the reaction kinetics and thus in reducing the reaction time by the addition of an esterification catalyst. As the catalyst is of acid type, various acids can be envisaged. However, care will probably be taken not to use acids of Lewis type (PTSA, $ZnCl_2$, Ti isopropyl, and the like). This is because they act at a level of the hydroxyl group carried by the chiral carbon of the lactic acid and thus can promote racemization reactions by activating a nucleophilic substitution with inversion of configuration on the methine group. In contrast, protonic acids of $H_2SO_4$, $H_3PO_4$, and the like, type can be used as they act on the oxygen of the carbonyl group, which ought under no circumstances to promote racemization reactions. Given the acidic nature of the starting material, the catalyst can be added during the process, that is to say when the residual free acidity of the oligomer will no longer be sufficient to effectively activate the reaction. Depending on the type of acid selected as catalyst, neutralization can be envisaged so as to avoid decomposition of lactide during the depolymerization stage.

The reaction kinetics are strongly influenced by the temperature. However, the latter also promotes racemization reactions, which have to be avoided at all costs. In this context, the use of temperatures of less than 190° C. and of a reactor which can operate under vacuum or under gas streams and which offers a large exchange surface area and a large extraction volume will make it possible to solve the problem.

This is because the large exchange surface area will make it possible to provide, in the minimum of time, the energy necessary for the reaction while avoiding overheating, while the large extraction volume will promote the removal of the volatile compound (water) and thus the reaction kinetics. In this context, different reactors can be advantageous alternatives, such as, for example, falling film evaporators, forced circulation evaporators, agitated film evaporators, with or without an internal condenser, and the like.

This phase of the process can be envisaged in one or more stages in order to optimize the technology with regard, on the one hand, to the viscosity of the streams present, on the other hand to the lactic acid content present in the distillates and, finally, to the possible need to add an esterification catalyst in order to redynamize the synthesis.

The second stage consists of a catalytic and thermal depolymerization of the oligomers obtained above, so as to produce a vapor phase rich in lactide. The use of a catalyst proves to be essential in order to reduce the thermal cracking temperature and to avoid the chemical and optical deterioration in the lactide synthesized. The catalyst will be solid or liquid and of Lewis acid type, such as, for example, tin octoate, tin lactate, antimony octoate, zinc octoate, and the like. Its content is between 0.1 and 5 g %. Catalysts of Lewis acid type are characterized by relatively high charge density. In point of fact, it has been demonstrated that these densities promote racemization reactions. In this context, it is preferable to reduce as much as possible the contact time between the catalyst and the oligomers; care will thus be taken to mix the catalyst immediately before it is introduced into the reactor.

For the same reasons, the reactor will be selected so as to maintain the (oligomer/catalyst) mixture for the least time possible (0 to 30 min and preferably 0 to 15 min) at the reaction temperature while offering a large exchange surface area and a large extraction volume. The operating temperature will be sufficient to initiate the reaction but not excessively high, in order to avoid decomposition or racemization of the lactide: the temperature will be between 180 and 250° C. The temperature optimum will depend on the nature of the starting oligomer (120 to 125%), the nature of the catalyst and the pressure in the system.

Given the chemical instability of the lactide at the operating temperatures and in order to shift the equilibrium of the reaction towards the formation of the lactide, it is important to extract it as rapidly as possible from the reaction medium. In this context, it is preferable to maintain the reaction medium under a gas stream and/or under vacuum. The second option will be preferred as it also makes it possible to reduce the reaction temperature.

As a result of the various constraints mentioned above, the use of an evaporator of thin layer type, such as, for example, a thin film evaporator, seems particularly relevant. This is because a liquid residue composed of oligomers with high molecular masses is extracted at the bottom from this type of device. This residue will be recycled after hydrolysis, care being taken to carry out a pretreatment or a bleed which makes it possible to remove the deactivated catalyst.

At the top, the vapor phase rich in lactide is directly extracted and selectively condensed in a condenser maintained at a very specific temperature. This is because the condenser is maintained at a temperature such that, on the one hand, the volatile compounds, such as water, most of the lactic acid and decomposition products resulting from the synthesis (acetaldehyde, and the like), remain in the vapor phase (while the lactide and the heavy compounds are condensed) and not too low, on the other hand, to avoid crystallization of the lactide. Depending on the nature and on the purity of the product collected (crude lactide product), this temperature will be between 70 and 125° C.

On conclusion of this selective condensation, there is present a crude product characterized by an L-LD content of greater than 85%, indeed even 90%, a meso-LD content of less than 7%, indeed even of less than 5%, or even of less than 3%, and a residual water content of less than 1000 ppm, indeed even of less than 500 ppm.

The subsequent stage of the process consists of a purification of the crude product in order to obtain a lactide with a chemical and stereospecific purity sufficient for the synthesis of PLA by ring opening. A sufficient purity implies a content of a lactide of between 99.0 and 99.9% and more preferably between 99.5 and 99.9%, a meso-LD content of between 0 and 1% and preferably between 0 and 0.5%, a water content of between 0 and 200 ppm and preferably between 0 and 50 ppm, and an acidity of between 0 and 10 meq/kg and preferably between 0 and 1 meq/kg.

The technology of the melt recrystallization (one or more stages) makes it possible to achieve this quality while operating at low temperature. In the context of this technology, the impure lactide obtained above is melted and subjected to controlled cooling in order to initiate the crystallization. The impurities will be concentrated in the liquid phase. After the crystallization, the liquid phase is removed by gravity, leaving crystals coated with a film of impurities. In order to remove it, a partial remelting is carried out. The liquid thus obtained entrains the film and is removed by gravity. The operation is repeated until the required purity is achieved. This sequence of stages can be of the static and/or dynamic type. The desired purity is achieved, the contents of the crystallizer are melted and recovered.

However, the profitability of this purification stage is related to the concentration of L-LD, to the nature of the chemical impurities of the feed and to the concentration of L-LD present in the residues from the stage.

This is because the nature of the impurities present in the starting feed directly influences the effectiveness of the purification. Thus, a more viscous impurity will be extracted with greater difficulty and will require several purification stages. Likewise, the presence of acidic and aqueous impurities will promote the opening of the lactide ring, which will have a direct consequence on the yield of the stage.

Moreover, the concentration of L-LD in the starting solution makes it possible to significantly improve the yield by weight (fewer impurities to be extracted, less decomposition) but also the profitability (fewer purification stages). Thus, according to a person skilled in the art, while the theoretical yield for purification by melt crystallization with a feed comprising 85% of L-LD is 78.5%, it changes to 86.4% for a feed comprising 90% of L-LD.

However, when the theoretical purification yield is taken into account, it is also necessary to include therein the concentration factor of L-LD in the residue. This is because, in the context of an integrated process, it is preferable to be able to recycle the residue as lactide upstream in the process (for example, to enrich a fraction) in order to avoid having to recycle it as lactic units (resulting from the hydrolysis of the lactide), which increases the probability of thermal decomposition (increased residence time in the process) and results in a significant energy cost. In point of fact, in order to be able to recycle it in the melt crystallization as lactide, it is necessary for its concentration to be sufficiently high (that is to say, of the order of 70%) so as to be able to mix it with a richer intermediate fraction and to reintroduce it into the main process stream and if possible the closest to the final purification stage. Under these conditions, starting from a feed comprising 85% of L-LD, the theoretical yield for purification by melt crystallization is 78.5%, if the L-LD content of the residue is 55%, but it falls to 58.9% if the content in the residue is 70%. Furthermore, with the residue comprising an L-LD charge of 70%, it will be necessary to feed the unit with 200 kg of 85% product in order for the 100 kg of finished product to emerge, whereas only 150 kg of 85% product is necessary with the 55% residue. On taking into account these considerations, it is obvious that this type of technology cannot be used economically and on an industrial scale without a prepurification stage (such as, for example, distillation) which will make it possible to substantially increase the purity (the L-LD concentration) of the starting feed.

For this invention, an important aspect is the incorporation in the process of a technology which makes it possible to recover the lactide, in the lactide form and not in the form of a lactic unit, from a residue with a low charge (for example of the order of 40%), the minimum being related to the presence of a eutectic. In this context, the melt recrystallization can be run in a different way and makes it possible to obtain, for a feed comprising 88% of L-LD, a theoretical purification yield of 87% while requiring a feed charge of only 132 kg per 100 kg of finished product. On taking into account these new considerations, it is obvious that this type of technology can, at this time, be used economically and on an industrial scale without a high-temperature prepurification stage.

The technology which makes possible the recovery of the lactide from the residue from the melt recrystallization stage will preferably ensure that:

either a lactide with a purity sufficient to be able to be treated by melt recrystallization is produced, that is to say with an L-LD content equal to or greater than 60% and with a residual water content which is sufficiently low (<1000 ppm and preferably less than 400 ppm) to prevent rapid deterioration of the lactide;

or a lactide with a sufficient chemical purity to be able to be used directly as monomer for the synthesis of PLA by ring opening is produced.

The technology preferably considered for the extraction of lactide from the residue in the context of this invention comprises the following stages:

1. extractive and controlled crystallization of the residue from the melt crystallization (residues) in an aqueous medium while controlling the geometry of the crystals formed and while bringing about phase segregation between the lactide (solid phase) and the impurities (liquid phase), promoting aqueous extraction of the impurities;

2. separation of the suspension of crystals which is obtained in 1 into a liquid phase depleted in lactide and laden with impurities and into a wet cake rich in lactide crystals;

3. drying the wet cake obtained in 2.

As this technology is not stereospecific, the product resulting from this stage can attain a very high chemical purity and can also comprise a certain content of meso-lactide, which constitutes a very advantageous method for the extraction of the D-lactic units from the process. The product thus obtained could be used as additive and mixed with the purified lactide in order to control the content of D-lactic units present and thus to vary the properties of the polymer synthesized.

The lactide, purified and prepurified, synthesized by the process described in the context of this invention can subsequently either be used as additive for food applications (for example: agent which coagulates animal or plant proteins, preservative or pH regulator, raising agent for dough in breadmaking) or can be polymerized by ring opening by a large range of catalysts, including organometallic derivatives of transition metals (Groups 3 to 12) or metals from Groups 13 to 15.

A favorite approach of the present invention is the continuous polymerization of the purified lactide by virtue of the addition of the tin octoate/triphenylphosphine pair to a twin-screw extruder (reactive extrusion).

Although a single reactive extrusion stage is sufficient to succeed in synthesizing, starting from the lactide, a PLA having mechanical properties sufficient to be able to be used in the field of packaging and commodity products, this prospect can result in the following disadvantages:

a low throughput/productive output (prohibitive depreciation costs);

a low stability range for the management of the production units (situation of precarious balance).

This productive output is related to the nature of the starting material fed to the twin-screw extruder. This is because the lactide is fed to an extruder which is maintained at a temperature far above its melting point. In point of fact, beyond this melting point, its viscosity is virtually zero. Consequently, a large part of the reactor is used outside its optimum operating conditions for:

degassing and bringing the starting material to reaction temperature (heating by calender) during the feeding of a lactide in the solid form;

promoting the propagation of the synthesis (homogenization of the mixture).

It is only when the viscosity is sufficient that the extruder can effectively accelerate the reaction by virtue of optimum mixing at high viscosity and by an additional energy contribution related to frictional phenomena.

Moreover, the absence of viscosity in the first part of the machine renders the system much more sensitive to possible fluctuations in one of the production parameters (feed flow rate, catalyst concentration, viscosity (pressure) at the die head, and the like).

In this context, it would be judicious to include therein a first stage of continuous prepolymerization which would be carried out in any reactor capable of:

melting (and degassing) the lactide;

adding the active principle (catalyst and optionally cocatalyst) and the optional additives (comonomers, oligomers, prepolymers, stabilizers, fillers, reinforcing agents, polymerization moderators);

homogenizing the active principle and the additives in the molten lactide and maintaining the mixture at the polymerization temperature;

initiating the polymerization so as to obtain a product with a viscosity sufficient to be able to be effectively treated during the second stage (molecular mass between 5000 and 50 000);

feeding the product continuously to an extruder with the possibility of optionally adding other additives (comonomers, oligomers, prepolymers, stabilizers, fillers, reinforcing agents, polymerization moderators) and of homogenizing them.

The second stage will be carried out in a twin-screw extruder.

Moreover, as the synthesis in an extruder is continuous, it would be preferable, in order to ensure that the PLA produced is homogeneous, also to carry out the prepolymerization stage continuously. In this context, once the lactide is molten (and degassed), technologies of static mixer-heat exchangers (SMXL type from Sulzer or equivalent), static mixer-reactors (SMR type from Sulzer or equivalent) or twin-screw reactors of List ORP® or List CRP® type might be perfectly suitable. The advantage of this type of technology is, inter alia:

the narrow distribution in the residence times (homogeneity of the product fed to the twin-screw extruder, narrow polydispersity);

the high mixing and dispersing effectiveness for fluids of high viscosity or having a large viscosity difference (homogenization of the catalyst or additives in the monomer);

the high heat exchange capacity (to accelerate or control the reaction).

The PLA produced in the context of this invention will either be a homopolymer (for example, synthesis starting from pure L-lactide) or will be a copolymer (for example, synthesized starting from lactide comprising a proportion of meso-lactide or of additives).

Notes:
1. The process described regards lactic acid as starting material. However, this sequence of stages can certainly be applied to lactic acid esters, such as methyl lactate, ethyl lactate, isopropyl lactate, butyl lactate, and the like.
2. In the context of the use of a lactic acid ester as starting material, the oligomerization stage will necessarily require the use of an acid transesterification catalyst of para-toluenesulphonic acid (PTSA), tin octoate, sulphuric acid, and the like, type.
3. The process described considers solely the L isomer of lactic acid but it is obvious that it can also be taken into account for the other isomer, namely D-lactic acid.

A preferred description of the process forming the subject-matter of the present invention is described below with reference to FIG. 1.

The aqueous lactic acid solution is fed via the line 1 and can be mixed continuously with the hydrolysed liquor fed via the line 2001 and originating from the hydrolysis vessel 2000. However, a preferred option consists in recycling the hydrolysed liquor directly in the purification stages of the process for the production of lactic acid via the line 2002, so as to be able to remove the impurities, such as amino acids, proteins, metal ions, and the like, therefrom. A hydrolysis residue, preferably in solid form, can be removed via the line 2003, which makes it possible to bleed the system of insoluble product. The hydrolysis vessel is represented only diagrammatically by a vessel but several vessels can be envisaged, depending on the concentration and on the destination of the recycled fractions.

The mixture is fed continuously via the line 2 to a preheater 100 which brings the mixture to the temperature required for the evaporation of the water, that is to say between 50 and 150° C. It is possible to continuously add to the mixture, via the line 121, an esterification catalyst stored in the vessel 120. During the addition of a catalyst, the preheater 100 will preferably be designed so as to be able to heat and homogenize the mixture. In the evaporator 200, which can operate under vacuum, at atmospheric pressure or under slight pressure, the majority of the free water and a portion of the water of constitution are continuously removed in the vapor form via the line 202 and condensed 210. Depending on the content of lactic acid in the condensates, the latter are conveyed either to the hydrolysis vessel 2000 via the line 211 or as back-up water to the extractive crystallization vessel 700 via the line 212 or very simply discharged via the line 213.

The concentrated lactic acid continuously removed via the line 201 and characterized by an average molecular mass of between 100 and 600 is fed continuously to a preheater 250 which brings the concentrated lactic acid to the oligomerization temperature, that is to say between 80 and 180° C. It is possible to add to the mixture, via the line 261, an esterification catalyst stored in the vessel 260. During the addition of a catalyst, the preheater 250 will preferably be designed so as to be able to heat and homogenize the mixture. In the oligomerization reactor 300, which can operate under vacuum, at atmospheric pressure or under slight pressure, a small amount of free water and a predominance of water of constitution are removed in the vapor form via the line 302 and condensed 310. The condensates are conveyed to the hydrolysis vessel 2000 via the line 311. This stage will preferably be carried out under vacuum, without, however, reaching a pressure of less than 40 mbar absolute, so as to accelerate the reaction kinetics and to reduce the operating temperature while avoiding the production of an excessively large amount of the cyclic dimer.

The oligomers removed via the line 301 and characterized by a molecular mass of between 600 and 2000 are fed continuously to a preheater/mixer 400. This preheater/mixer makes possible the homogenization of the depolymerization catalyst fed continuously, at a concentration ranging from 0.2 to 5%, via the line 521 and stored in the vessel 520 and makes it possible to bring the oligomers/catalyst mixture to a temperature of between 150 and 250° C. (the exact temperature depending on the molecular mass of the oligomers). A neutralizing agent may have to be added to the oligomers in order to interrupt the activity of the esterification catalyst before incorporation of the depolymerization catalyst but this stage has not been represented in FIG. 1. It is also possible for the catalyst added in the oligomerization stage to be suitable for the backbiting reaction and, in this context, any addition of catalyst is reduced, indeed even superfluous.

The catalytic depolymerization reactor 500, which is fed via the line 401 with the oligomer/catalyst mixture, is managed so as to promote the backbiting reaction which generates the lactide. In this context, the temperature will be between 180 and 250° C., the pressure between 0.1 and 40 mbar absolute and the residence time of the mixture under the reaction conditions between 0 and 30 min, preferably between 0 and 15 min. The following are removed from the depolymerization reactor 500: on the one hand, a liquid residue (liquid at the operating temperature) rich in oligomers, which is conveyed via the line 502 to the hydrolysis vessel 2000, and, on the other hand, a vapor phase rich in lactide via the line 501.

The liquid residue collected as bottoms from the reactor is characterized by an average molecular mass equal to or greater than that of the starting mixture 401 and by a concentration of catalyst greater than that of the starting mixture 401.

The vapor phase removed at the top of the reactor 500 and rich in lactide 501 is selectively condensed in a condenser 510, so as to maintain the volatile compounds, such as water, lactic acid and decomposition products resulting from the synthesis, and the like, in the vapor form 513 and to recover the lactide and the heavier compounds in the liquid form (crude lactide product) 511. On conclusion of this selective condensation, the crude lactide product is characterized by an L-LD content of greater than 85%, indeed even of greater than 90%, a low meso-LD content of less than 7%, indeed of less than 5% and indeed even of less than 3%, and a residual water content of less than 1000 ppm, indeed even of less than 500 ppm. The condensation temperature is carefully adjusted according to the pressure prevailing in the system and so as to avoid solidification of the lactide. It will be between 70 and 125° C. The volatile compounds removed via the line 513 are condensed in their turn 550 and are transferred, via the line 551, to the hydrolysis vessel 2000.

The liquid crude lactide product is fed via the line 511 to a melt recrystallization unit 600 where the purification is carried out in one or more steps according to a static and/or dynamic process at low temperature, less than 105° C., so as to recover, via the line 601, a pure lactide in liquid form. The latter is characterized by a lactide content of between 99.0 and 99.9% and more preferably between 99.5 and 99.9%, a meso-LD content of between 0 and 1% and preferably between 0 and 0.5%, a water content of between 0 and 200 ppm and preferably between 0 and 50 ppm, and an acidity of between 0 and 10 meq/kg and preferably between 0 and 1 meq/kg. During this purification stage, two types of residues are generated. The first, removed via the line 603, comprises a sufficient residual L-LD content for it to be able to be mixed with the crude lactide product resulting from the selective condensation stage via 511. A sufficient residual L-LD content is regarded as being between 60 and 99%. The second residue (drain) removed via the line 602 comprises a residual L-LD content of between 80% and 35% and is conveyed in the liquid form to the extractive crystallization unit 700.

In this unit, the drain is mixed with an aqueous phase fed via the line 702 with a water content which can range from 0 to 40%. As already stated, the aqueous phase fed can originate from the condensates from the evaporation stage via the line 212 or at least in part from the subsequent stage of drying the prepurified lactide via the line 904. The temperature of the mixture is subsequently reduced so as to avoid excessively great supersaturation, so as to control the geometry of the crystals formed and to promote phase segregation between the lactide (solid phase) and the impurities (liquid phase).

The suspension of crystals thus obtained is subsequently transferred, via the line 701, to a solid/liquid separation unit 800 in order to obtain, on the one hand, a liquid phase depleted in lactide and laden with impurities, which will be conveyed via the line 802 to the hydrolysis vessel 2000. On the other hand, a wet cake rich in lactide crystals is recovered, which cake is characterized by a free water content of between 0 and 10%, a total lactide content of between 60 and 99%, a content of lactic acid and lactic acid oligomers of between 0 and 5%, and a meso-lactide content of between 0 and 15%.

The wet cake is subsequently fed, via the line 801, to a low-temperature dryer 900 (temperature of the product less than 45°), in order to prevent the meso-lactide from melting, which will make it possible to reduce the residual water content and to bring it to a value of between 1000 and 50 ppm. Depending on the purity of the prepurified lactide removed from the dryer via the line 901 and liquefied in a reheater 910, from where it will be removed via the line 911, it will either be mixed, via the line 913, with the product fed to step 1 of the melt recrystallization stage or fed directly to one of the intermediate steps of the melt recrystallization stage (not represented) or, finally, mixed, via the line 912, with the purified L-LD resulting from the melt recrystallization stage 601 in order subsequently to be polymerized. The mixture between the prepurified lactide 912 and the purified L-LD 601 will be adjusted so as to control the content of D-lactic unit (originating from the meso-lactide) present in the final polymer.

The purified L-LD 601 or the mixture of purified L-LD 601 and of prepurified lactide 912 is mixed with an active principle and brought to the polymerization temperature, which can be between 120 and 220° C., in a prepolymerization reactor 1000. The active principle or catalyst is stored in the vessel 1020 and is fed via the line 1021. Its concentration will be managed so as to maintain the monomer/catalyst ratio between 500 and 10 000, the exact content depending on the type of polymer desired. The catalyst mentioned above can also correspond to the mixture of a catalyst with a cocatalyst, such as, for example, the tin octoate/triphenylphosphine pair. The product resulting from the prepolymerization reactor may already consist of a prepolymer characterized by a molecular mass of between 10 000 and 50 000. The latter is fed via the line 1001 to a polymerization reactor 1100, which will preferably be of twin-screw extruder type, in order to continue and bring to completion the polymerization. The polymer resulting from this stage 1101 is characterized by a molecular mass which can be between 40 000 and 350 000 and a conversion of greater than 95%, indeed even of greater than 98%. Whether this is before the mixer/exchanger or at the polymerization reactor, comonomers, copolymers or additives (heat stabilizer, catalytic deactivators, filling or reinforcing components) can be mixed with the lactide stream but this approach is not represented in FIG. 1.

Another favored approach of the present invention consists in conveying the crude lactide product 511 resulting from the selective condensation via the line 512 to the extractive crystallization unit 700. In this unit, the crude lactide product is mixed with an aqueous phase fed via the line 702 with a water content which can range from 0 to 40%. The temperature of the mixture is subsequently reduced so as to avoid excessively great supersaturation, so as to control the geometry of the crystals formed and to promote phase segregation between the lactide (solid phase) and the impurities (liquid phase).

The suspension of crystals thus obtained is subsequently transferred, via the line 701, to a solid/liquid separation unit 800 in order to obtain, on the one hand, a liquid phase depleted in lactide and laden with impurities, which will be conveyed via the line 802 to the hydrolysis vessel 2000. On the other hand, a wet cake rich in lactide crystals is recovered, which cake is characterized by a free water content of between 0 and 10%, a total lactide content of between 60 and 99%, a content of lactic acid and lactic acid oligomers of between 0 and 5%, and a meso-lactide content of between 0 and 15%.

The wet cake is subsequently fed, via the line 801, to a low-temperature dryer (900) which will make it possible to reduce the residual water content and to bring it to a value of between 1000 and 50 ppm.

Depending on the purity of the prepurified lactide removed from the dryer via the line 901 and liquefied in a reheater at 910, from where it will be removed via the line 911, it will either be fed to the melt recrystallization stage via the line 911 or mixed, via the line 912, with the purified L-LD resulting from the melt recrystallization stage 601 in order subsequently to be polymerized.

The liquid prepurified lactide is fed via the line 911 to a melt recrystallization unit 600 where the purification is carried out in one or more steps according to a static and/or dynamic process at low temperature, less than 105° C., so as to recover, via the line 601, a pure lactide in liquid form which is characterized by a lactide content of between 99.0 and 99.9% and more preferably between 99.5 and 99.9%, a meso-LD content of between 0 and 1% and preferably between 0 and 0.5%, a water content of between 0 and 200 ppm and preferably between 0 and 50 ppm, and an acidity of between 0 and 10 meq/kg and preferably between 0 and 1 meq/kg. During this purification stage, two types of residues are generated. The first, removed via the line 603, comprises a sufficient residual L-LD content for it to be able to be mixed with the crude product resulting from the selective condensation stage via 511. A sufficient residual L-LD content is regarded as being between 60 and 99%. The second residue (drain) removed via the line 602 comprises a residual L-LD content of between 80% and 35% and is conveyed in the liquid form to the extractive crystallization unit 700.

EXAMPLES a) This Example Illustrates the Importance of the Recycling of the By-Products from the Synthesis of the Lactide in the Plant for the Purification of the Lactic Acid and not in the Oligomerization Stage A stock of lactic acid oligomers was fed to a depolymerization unit at an interval of one month in order to confirm or invalidate the constancy of the results and thus the possibility of recycling the D-lactic units directly in the process of the synthesis of the lactide.

During the storage period, the oligomer was kept fluid in a closed chamber with stirring and at a temperature of 140° C.

For the depolymerization, the oligomer is mixed with 2% of its weight of tin octoate and fed (25-30 kg/h) to a thin film evaporator maintained at 235° C. and with a surface area of 2 m². The vapor generated (impure lactide, crude product) is condensed and the product obtained weighed in order to determine the productive output of the system but also analysed in order to determine the selectivity thereof.

TABLE I

Characterization of the oligomer and of the effectiveness of the depolymerization

|  | Freshly prepared | Ageing for 1 month |
|---|---|---|
| Characterization of the oligomer | | |
| Free acidity (g %) | 9.8 | 10.5 |
| Total acidity (g %) | 122.4 | 122 |
| Content of L isomer (%) | 97.6 | 90 |
| Appearance | Amber | Very dark brown (black) |
| Characterization of the effectiveness of the depolymerization | | |
| Productive output (kg/h) | 24 | 10 |
| Conversion (%) | 80 | 40 |
| Content of L-lactide (g %) | 87.8 | 77.9 |
| Content of meso-lactide (g %) | 4.8 | 14.8 |

On the basis of the results shown in Table I, it is very clearly noticed that the optical quality and the productive output markedly decline. Prolonged maintenance of the lactic units at a relatively high temperature results in a gradual decomposition of the latter. The decomposition products generated have a strong disrupting influence on the reaction for the synthesis of the lactide. In this context, the recycling, in the oligomerization, of the lactate units present in the by-products which have been subjected to thermal stress without preliminary purification risks having a strong disrupting influence on the productive output of the process.

b) Example Demonstrating the Importance of the Incorporation of the Extraction with Water on the Yield of the Process A stirred reactor heated using 2 electrical resistors (1.2 kW and 2.3 kW) was fed with 20 liters of lactic acid sold by Galactic under the "heat-stable" label and characterized by a concentration of 90% and a content of L isomer of 97.6%. The temperature of the heating resistors and in the liquid is regulated so as to avoid any difference of greater than 20° C. and to prevent the maximum temperature from exceeding 160° C. In order to facilitate the rapid extraction of the volatile compound, the unit is placed gradually under vacuum, the pressure varying between atmospheric pressure and 150 mbar. In order to avoid excessively great entrainment of lactic acid in the distillates, the reactor is surmounted by a column with a height of 0.90 m and a cross section of 0.09 m filled with Raschig rings (10×10 mm). A temperature probe placed at the column top makes it possible to monitor the temperature of the vapors and, if necessary, to reduce the heating power in order to prevent excessively great entrainment.

After reacting for 7 h, 6.3 kg of distillates characterized by a total acidity of 3.3% were collected, along with 17.4 kg of an oligomer characterized by a total acidity of 122.2%, a molecular mass of 1345 and a content of L isomer of 97.3%.

3% by weight of tin octoate are added to the oligomer obtained above and kept stirred at a temperature of 120° C. The mixture is fed at a flow rate of 3 kg/h to a thin layer evaporator of thin film type made of stainless steel 316 with a surface area of 0.2 m², the walls of which are heated by circulation of oil, the temperature of which is maintained at 220-230° C. The vapors generated are condensed in a condenser with a surface area of 1 m² made of stainless steel 316, the temperature of the liquid "coolant" of which is maintained between 80 and 90° C. The entire unit is run under a pressure of between 5 and 10 mbar absolute. The crude lactide product is collected at the outlet of the condenser at a flow rate of 2.45 kg/h, has a content of L-lactide varying between 85 and 92% and has a content of meso-lactide varying between 3 and 7%.

A sample of the crude lactide product obtained above (800 g), comprising 86.4% of L-LD, 4.8% of meso-LD and a residual acidity of 310 meq/kg, is introduced into a crystallizer composed of a vertical tube made of stainless steel with a length of 1 m and a diameter of 30 mm. The jacket of the tube is fed with heat-exchange fluid via a thermostatically-controlled heating unit for the control of the crystallization, sweating or remelting phases. This crude product is melted at 105° C.

Subsequently, the crystallization is initiated on the wall by a gradual reduction in the temperature of the heat-exchange fluid present in the jacket. To prevent occlusions and inclusions in the pure crystals, this fall in temperature will be from 2 to 8° C./h. A portion of the crude product is crystallized on the wall, whereas the central part includes the liquid phase (drain) comprising the majority of the impurities.

Once the heat-exchange fluid has been brought to 60° C., the liquid phase is removed by gravity.

The crystals are still covered with a film of impurities which has to be removed by the sweating stage: the surface of the tube will be heated very gradually (from 60 to 98° C.) so as to cause the surfaces of the less pure crystals to melt as their melting point is lower than that of the pure product.

Finally, the crystallizer is brought (at 10° C./min) to the melting point of the product (97-102° C.) in order to liquefy all the product, collected by gravity (melt).

A final product, which has to meet the specifications of a lactide for the synthesis of the PLA, will be subjected to several successive steps of purification by the same procedure.

The enriching of the intermediate fractions and the overall yield (Yd) by weight of L-LD of the operation are shown in Table II.

TABLE II

|  | Feed | Step 1 Melt | Step 1 Drain | Step 2 Melt | Step 3 Melt | Step 4 Melt |
| --- | --- | --- | --- | --- | --- | --- |
| L-LD (%) | 86.4 | 97 | 55.9 | 99 | 99.8 | 99.9 |
| meso-LD (%) | 4.8 | 2 | 10.3 | 0.7 | 0.2 | 0.1 |
| Acidity (meq/kg) | 520 | 120 | — | 56 | 18 | 7 |
| Yd of L-LD (%) | 100 | — | 19 | — | — | 81 |

The L-LD and meso-LD contents are determined by GC after silylation of the carboxyl compounds. The acidities are assayed by potentiometry with tetrabutylammonium hydroxide (TBAH) in an anhydrous solvent. The water contents were determined by Karl Fisher.

The drains resulting from the first steps were mixed so as to obtain a mixture comprising 55.9% of L-LD and 9.8% of meso-LD. This product will be subjected to a prepurification, before being mixed with the product resulting from the depolymerization for purification by melt recrystallization in accordance with the procedure described above.

25% by weight of cold water are added to 750 g of crude product at 90° C. The mixture is brought rapidly to its crystallization temperature and will remain there for 30 min in order to promote the nucleation and then the growth of the crystals (by seeding with pure lactide crystals). Subsequently, the temperature is gradually reduced to 25° C.

The mixture is subsequently centrifuged at 1500 revolutions/min and 367 g of large white crystals (of approximately 0.4 mm) are collected and dried under vacuum at 45° C. The analysis of this product after drying appears in Table III.

TABLE III

|  | After drying |
| --- | --- |
| L-LD (%) | 93.8 |
| meso-LD (%) | 6.1 |
| Water (ppm) | 440 |

The dried product resulting from this treatment, after being mixed with the product resulting from the depolymerization, will be subjected to several steps of purification by melt recrystallization in accordance with the procedure described above.

Table IV shows an increase in the yield and in the effectiveness of the melt purification.

TABLE IV

|  | Feed | Step 1 Melt | Step 1 Drain | Step 2 Melt | Step 3 Melt | Step 4 Melt |
| --- | --- | --- | --- | --- | --- | --- |
| L-LD (%) | 88.5 | 98.3 | 55 | 99.5 | 99.85 | 99.95 |
| meso-LD (%) | 5.2 | 2.3 | 12.4 | 0.5 | 0.1 | <0.1 |
| Acidity (meq/kg) | 290 | 90 | — | — | — | 3 |
| Yd of L-LD (%) | 100 | — | 14 | — | — | 86 |

It should be noted that the product resulting from the prepurification in the aqueous phase can be recycled at any point in the sequence for purification by melt crystallization.

c) Example Demonstrating the Possibility of Obtaining a Polymerizable Product on Conclusion of the Aqueous Prepurification Stage A sample of crude lactide product comprising 79.1% of L-LD and 9.2% of meso-LD will be subjected to an aqueous prepurification treatment.

25% by weight of cold water are added to 1.520 kg of crude product at 80° C. The mixture is rapidly brought to its crystallization temperature and will remain there for 30 min. In order to promote the growth of the crystals, seeding is carried out using pure lactide crystals. Subsequently, the temperature is reduced to 25° C.

The mixture is subsequently centrifuged and 915 g of large white crystals (of approximately 0.65 m) are collected and dried. The analysis of the dried product appears in Table V.

TABLE V

|  | After drying |
| --- | --- |
| L-LD (%) | 95.2 |
| meso-LD (%) | 4.5 |
| Acidity (%) | 0.2 |
| Water (ppm) | 200 |

A small amount (5 g) of the dried product resulting from this treatment was mixed with 5 g of L-LD obtained by melt crystallization (cf. Table IV, step 4: L-LD 99.95%; acidity 3 meq/kg; water 47 ppm). This mixture was introduced into a test tube while flushing with nitrogen. After dissolving the mixture (100° C.), a tin octoate solution was added so as to observe a monomer/catalyst molar ratio of 4500. Once the solution was well homogenized, it was immersed in an oil bath, the temperature of which was thermostatically controlled at 180° C.

After synthesizing for one hour, the test tube was removed and broken, so as to recover a very rigid and opaque polymer. The polymer obtained was analysed by GPC in chloroform at 35° C.: its distribution of molecular masses weighted by weight was 68 000 (Mw with PS calibration corrected on an absolute basis using universal calibration (KPS=1.67×10$^{-4}$, aPS=0.692, KPLA=1.05×10$^{-3}$, aPLA=0.563).

d) Example Demonstrating the Effectiveness of the Process Starting from a Crude Lactide Product Synthesized from a Lactic Acid Ester An amount of ethyl lactate, sold by Galactic under the "Galaster EL 97" label and characterized by a concentration of ethyl ester of 97%, of 20 liters is fed to the plant described in Example b. In order to make possible the transesterification reactions, para-toluenesulphonic acid is added as catalyst at a concentration of 0.5% by weight. The temperature of the heating resistors and in the liquid is regulated so as to avoid any difference of greater than 20° C. and to prevent the maximum temperature from exceeding 175° C. To facilitate the rapid extraction of the volatile compound and to prevent excessively great entrainment of the ester in the distillates, the procedure as in Example b will be followed.

After reacting for 10 h, 7.8 kg of distillates characterized by an ethyl lactate content of 3% were collected, along with 12.6 kg of an oligomer characterized by a molecular mass of 960 and a content of L isomer of 97.1%.

The oligomer obtained above is treated as in Example b but 1.5% by weight of tin octoate are added and then the flow rate of the mixture is set at 2 kg/h, while the temperature of the liquid "coolant" is maintained between 85 and 95° C. The crude lactide product is collected at the outlet of the condenser at a flow rate of 1.78 kg/h, has an L-lactide content varying between 73 and 78% and has a meso-lactide content varying between 2 and 5%.

A sample of the crude lactide product obtained above (750 g), comprising 75.3% of L-LD, 2.3% of meso-LD and a residual acidity of 83 meq/kg, is treated by following a procedure identical to that set out in Example b.

The enriching of the intermediate fractions and the overall yield by mass of L-LD of the operation are shown in Table VI.

TABLE VI

|  | Step 1 | | Step 2 | Step 3 |
|---|---|---|---|---|
|  | Feed | Melt | Drain | Melt | Melt |
| L-LD (%) | 75.3 | 98.4 | 43.7 | 99.4 | 99.8 |
| meso-LD (%) | 2.3 | 0.3 | 5.1 | <0.1 | <0.1 |
| Acidity (meq/kg) | 83 | 27 | — | — | 4 |
| Yd of L-LD (%) | 100 | — | 26.7 | — | 73.0 |

The L-LD and meso-LD contents are determined by GC after silylation of the carboxyl compounds. The acidities are assayed by potentiometry with tetrabutyl-ammonium hydroxide (TBAH) in an anhydrous solvent. The water contents were determined by Karl Fisher.

The drains resulting from the first steps were mixed so as to obtain a mixture comprising 42.3% of L-LD and 5.2% of meso-LD. It will be subjected to a prepurification, before being mixed with the product resulting from the depolymerization for purification by melt recrystallization identical to that of Example b.

25% by weight of cold water are added to 1.050 kg of crude product at 80° C. and the procedure described in Example b was repeated. The mixture is subsequently centrifuged and 397 g of large white crystals (of approximately 0.85 mm) are collected and dried under vacuum at 45° C. The analysis of this product after drying appears in Table VII.

TABLE VII

|  | After drying |
|---|---|
| L-LD (%) | 92.8 |
| meso-LD (%) | 4.3 |
| Water (ppm) | 385 |

The dried product resulting from this treatment, after being mixed with the product resulting from the depolymerization, will be subjected to several steps of purification by melt recrystallization in accordance with Example b.

Table VIII shows an increase in the yield and in the effectiveness of the melt purification.

TABLE VIII

|  | Step 1 | | Step 2 | Step 3 |
|---|---|---|---|---|
|  | Feed | Melt | Drain | Melt | Melt |
| L-LD (%) | 79.2 | 99.1 | 42.7 | 99.8 | 99.9 |
| meso-LD (%) | 2.5 | 0.3 | 5.9 | <0.1 | <0.1 |
| Acidity (meq/kg) | 87 | 20 | — | 9 | 1 |
| Yd of L-LD (%) | 100 | — | 20.2 | — | 80 |

It should be noted that the product resulting from the prepurification in the aqueous phase can be recycled at any point in the sequence for purification by melt crystallization.

The invention claimed is:

1. A process for the production and purification of lactide, wherein, staffing from an aqueous solution of lactic acid or lactic acid derivatives, the stages comprise:
   a) evaporation of free water and a portion of the water of constitution until oligomers having a molecular mass of between 400 and 2000 amu, a total acidity as lactic acid equivalent of between 119 and 124.5% and an optical purity, expressed as L-lactic acid, of between 90 and 100% are obtained;
   b) feeding a mixture comprising a depolymerization catalyst and the oligomers obtained in step a) to a depolymerization reactor to produce:
      b1) a lactide-rich vapor phase, and
      b2) an oligomer-rich liquid residue;
   c) selective condensation of the lactide-rich vapor with recovery, in the liquid form, of a crude lactide product freed from the volatile compounds;
   d) melt crystallization of the crude lactide product to produce:
      d1) a purified lactide fraction having a residual acidity of less than 10 meq/kg, a water content of less than 200 ppm, a total lactide content of 99-99.9% and a meso-lactide content of less than 1%; and
      d2) at least a first residual fraction having a lactide content comprise between 35 and 80%; and
   e) separating the purified lactide from the step d1) and the at least first residual fraction from the step d2); and
   f) aqueous treatment of said at least first residual fraction from the step d2) of melt crystallization, consisting of:
      f1) extractive and controlled crystallization of the residue fractions in an aqueous medium, with control of the geometry of crystals formed and with segregation of a lactide suspension towards a solid phase and of impurities towards a liquid phase to carry out aqueous extraction of the impurities;
      f2) separation of the suspension of crystals formed in step e1) from the liquid phase and then draining to separate a wet cake rich in lactide crystals from a liquid phase depleted in lactide and laden with impurities; and f3) drying the wet cake to provide prepurified lactide obtained from said at least first residual fraction of said step d2).

2. A process for the production of polylactide, wherein the stages of production and of purification of lactide, starting from an aqueous solution of lactic acid or lactic acid derivatives, comprise:

a) evaporation of free water and a portion of the water of constitution until oligomers having a molecular mass of between 400 and 2000 amu, a total acidity as lactic acid equivalent of between 119 and 124.5% and an optical purity, expressed as L-lactic acid, of between 90 and 100% are obtained;

b) feeding a mixture comprising a depolymerization catalyst and the oligomers obtained in step a) to a depolymerization reactor to produce:
   b1) a lactide-rich vapor phase, and
   b2) an oligomer-rich liquid residue;

c) selective condensation of the lactide-rich vapor with recovery, in a liquid form, of a crude lactide product freed from volatile compounds;

d) melt crystallization of the crude lactide product formed in step c) to produce:
   d1) a purified lactide fraction having a residual acidity of less than 10 meq/kg, a water content of less than 200 ppm and a meso-lactide content of less than 1%; and
   d2) at least a first residual fraction having a lactide content comprise between 35 and 80%; and e) separating the purified lactide from the step d1) and the at least first residual fraction from the step d2); and f) aqueous treatment of said at least first residual fraction from the step d2) of melt crystallization, consisting of:
   f1) extractive and controlled crystallization of the residual fractions in an aqueous medium, with control of the geometry of crystals formed and with segregation of a lactide suspension towards a solid phase and of impurities towards a liquid phase to carry out aqueous extraction of the impurities;
   f2) separation of the suspension of crystals formed in step e1) from the liquid phase and then draining to separate a wet cake rich in lactide crystals from a liquid phase depleted in lactide and laden with impurities; and
   f3) drying the wet cake to provide prepurified lactide obtained from said at least one first residual fraction of said step d2);

g) polymerization of the purified lactide fraction obtained in said step d1) to polylactide.

3. The process according to claim 1, wherein the lactic acid derivatives comprise lactic acid esters.

4. The process according to claim 1, wherein the lactic acid derivatives comprise a mixture of lactic acid and one or more lactic acid esters.

5. The process according to claim 1, wherein the crude lactide product is enriched in prepurified lactide fractions originating from the aqueous treatment of the residual fractions from the step of melt crystallization.

6. The process according to claim 1, wherein the prepurified lactide resulting from the aqueous treatment can be recycled at any point during the production and purification of lactide.

7. The process according to claim 1, wherein a content of D-lactide during the process is controlled by polymerization by ring opening of the prepurified lactide.

8. The process according to claim 1, wherein the prepurified lactide obtained from the aqueous treatment e) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

9. The process for the production of polylactide according to claim 2, wherein the polymerization of at least one of the purified lactide and the prepurified lactide comprises the steps of:

a) addition of a catalyst or a mixture of catalysts to the lactide to form a mixture;

b) initiation of the prepolymerization with addition to the mixture formed in step a) of optional comonomers, oligomers, prepolymers, stabilizers, fillers, reinforcing agents or polymerization moderators; and c) polymerization in an extruder with addition of optional comonomers, oligomers, prepolymers, stabilizers, fillers, reinforcing agents or polymerization moderators.

10. The process for the production of polylactide according to claim 2, wherein the polymerization of at least one of the purified lactide and the prepurified lactide comprises the steps of:

a) addition of a catalyst or a mixture of catalysts to the lactide to form a mixture;

b) polymerization in an extruder with addition to the mixture formed in step a) of optional comonomers, oligomers, prepolymers, stabilizers, fillers, reinforcing agents or polymerization moderators.

11. The process for the production of polylactide according to claim 2, wherein, during the purification and the production of polylactide, the recycled fractions of lactic acid or the lactic acid derivatives are introduced in the purification stage of the process for the production of lactic acid or the lactic acid derivatives.

12. The process for the production of lactide according to claim 1, wherein, during the production and the purification of lactide, the recycled fractions of lactic acid or the lactic acid derivatives are introduced in the purification stage of the process for the production of lactic acid or the lactic acid derivatives.

13. The process according to claim 2, wherein the lactic acid derivatives comprise lactic acid esters.

14. The process according to claim 2, wherein the lactic acid derivatives comprise a mixture of lactic acid and one or more lactic acid esters.

15. The process according to claim 2, wherein the crude lactide product is enriched in prepurified lactide fractions originating from the aqueous treatment of the residual fractions from the step of melt crystallization.

16. The process according to claim 2, wherein the prepurified lactide resulting from the aqueous treatment can be recycled at any point during the production and purification of lactide.

17. The process according to claim 2, wherein a content of D-lactide during the process is controlled by polymerization by ring opening of the prepurified lactide.

18. The process according to claim 2, wherein the prepurified lactide obtained from the aqueous treatment f) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

19. The process for the production of polylactide according to claim 9, wherein, during the purification and the production of polylactide, the recycled fractions of lactic acid or the lactic acid derivatives are introduced in the purification stage of the process for the production of lactic acid or the lactic acid derivatives.

20. The process for the production of polylactide according to claim 10, wherein, during the purification and the production of polylactide, the recycled fractions of lactic acid or the lactic acid derivatives are introduced in the purification stage of the process for the production of lactic acid or the lactic acid derivatives.

21. The process according to claim 3, wherein the crude lactide product is enriched in prepurified lactide fractions originating from the aqueous treatment of the residual fractions from the step of melt crystallization.

22. The process according to claim 4, wherein the crude lactide product is enriched in prepurified lactide fractions originating from the aqueous treatment of the residual fractions from the step of melt crystallization.

23. The process according to claim 3, wherein the prepurified lactide resulting from the aqueous treatment can be recycled at any point during the production and purification of lactide.

24. The process according to claim 4, wherein the prepurified lactide resulting from the aqueous treatment can be recycled at any point during the production and purifaction of lactide.

25. The process according to claim 5, wherein the prepurified lactide resulting from the aqueous treatment can be recycled at any point during the production and purification of lactide.

26. The process according to claim 3, wherein a content of D-lactide during the process is controlled by polymerization by ring opening of the prepurified lactide.

27. The process according to claim 4, wherein a content of D-lactide during the process is controlled by polymerization by ring opening of the prepurified lactide.

28. The process according to claim 5, wherein a content of D-lactide during the process is controlled by polymerization by ring opening of the prepurified lactide.

29. The process according to claim 6, wherein a content of D-lactide during the process is controlled by polymerization by ring opening of the prepurified lactide.

30. The process according to claim 3, wherein the prepurified lactide obtained from the aqueous treatment f) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

31. The process according to claim 4, wherein the prepurified lactide obtained from the aqueous treatment f) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

32. The process according to claim 5, wherein the prepurified lactide obtained from the aqueous treatment f) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

33. The process according to claim 6, wherein the prepurified lactide obtained from the aqueous treatment f) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

34. The process according to claim 7, wherein the prepurified lactide obtained from the aqueous treatment f) of the residual fractions d2) exhibits a residual water content of between 50 and 1000 ppm, a total lactide content of between 70 and 99%, a content of lactic acid and lactic acid oligomers of between 0 and 5% and a meso-lactide content of between 0 and 15%.

* * * * *

UNITED STATES PATENT AND TRADEMARK OFFICE
CERTIFICATE OF CORRECTION

PATENT NO. : 7,488,783 B2
APPLICATION NO. : 10/523061
DATED : February 10, 2009
INVENTOR(S) : Coszach et al.

It is certified that error appears in the above-identified patent and that said Letters Patent is hereby corrected as shown below:

Claim 1, Column 20, Line 31: "staffing" should read as "starting"

Claim 1, Column 20, Line 47: delete "the"

Claim 1, Column 20, Line 54: "comprise" should read as "comprised"

Claim 1, Column 20, Line 55: add "fraction" between "lactide" and "from"

Claim 1, Column 20, Line 67: "e1)" should read as "f1)"

Claim 2, Column 21, Line 31: "comprise" should read as "comprised"

Claim 2, Column 21, Line 43: "e1)" should read as "f1)"

Claim 8, Column 22, Line 2: "e)" should read as "f)"

Signed and Sealed this

Fourteenth Day of April, 2009

JOHN DOLL
*Acting Director of the United States Patent and Trademark Office*